United States Patent
Kowase

(10) Patent No.: US 10,128,049 B2
(45) Date of Patent: Nov. 13, 2018

(54) MULTILAYER CERAMIC CAPACITOR

(71) Applicant: TAIYO YUDEN CO., LTD., Taito-ku, Tokyo (JP)

(72) Inventor: Yusuke Kowase, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/438,613

(22) Filed: Feb. 21, 2017

(65) Prior Publication Data

US 2017/0250027 A1    Aug. 31, 2017

(30) Foreign Application Priority Data

Feb. 26, 2016    (JP) .................................. 2016-035706

(51) Int. Cl.
| | |
|---|---|
| *H01G 4/248* | (2006.01) |
| *H01G 4/06* | (2006.01) |
| *H01G 4/30* | (2006.01) |
| *H01G 4/005* | (2006.01) |
| *H01G 4/12* | (2006.01) |
| *H01G 4/012* | (2006.01) |
| *H01G 4/232* | (2006.01) |

(52) U.S. Cl.
CPC .............. *H01G 4/30* (2013.01); *H01G 4/005* (2013.01); *H01G 4/012* (2013.01); *H01G 4/12* (2013.01); *H01G 4/232* (2013.01); *H01G 4/248* (2013.01)

(58) Field of Classification Search
CPC ............ H01G 4/30; H01G 4/12; H01G 4/005; H01G 4/248; H10G 4/005
USPC ......... 361/321.1, 306.1, 301.4, 321.2, 321.3, 361/311, 310
See application file for complete search history.

(56) References Cited

U.S. PATENT DOCUMENTS

2015/0027764 A1*    1/2015    Lee .......................... H01G 4/30
                                                                                174/260

FOREIGN PATENT DOCUMENTS

JP            2015228481 A       12/2015

* cited by examiner

*Primary Examiner* — Eric Thomas
*Assistant Examiner* — Arun Ramaswamy
(74) *Attorney, Agent, or Firm* — Law Office of Katsuhiro Arai

(57) ABSTRACT

In an embodiment, a multilayer ceramic capacitor 10 is formed in such a way that a first face f1 of a capacitor body 11 has a concave shape and a first part 12a of a first external electrode 12 contacts the concave-shaped first face f1, and that a second face f2 of the capacitor body 11 has a concave shape and a first part 13a of a second external electrode 13 contacts the concave-shaped second face f2.

8 Claims, 2 Drawing Sheets

| | Dmax (μm) | Dmin (μm) | Dmin/Dmax | Rate of drop in capacitance (%) | Incidence of delamination (%) |
|---|---|---|---|---|---|
| Sample 1 | 520 | 520 | 1.00 | 24.5 | 0 |
| Sample 2 | 520 | 515 | 0.99 | 24.2 | 0 |
| Sample 3 | 520 | 510 | 0.98 | 21.9 | 0 |
| Sample 4 | 520 | 504 | 0.97 | 21.7 | 0 |
| Sample 5 | 520 | 499 | 0.96 | 21.5 | 0 |
| Sample 6 | 520 | 494 | 0.95 | 21.2 | 0 |
| Sample 7 | 520 | 489 | 0.94 | 21.0 | 0 |
| Sample 8 | 520 | 484 | 0.93 | 20.8 | 0 |
| Sample 9 | 520 | 478 | 0.92 | 20.6 | 0 |
| Sample 10 | 520 | 473 | 0.91 | 20.3 | 0 |
| Sample 11 | 520 | 468 | 0.90 | 20.1 | 0 |
| Sample 12 | 520 | 463 | 0.89 | 19.9 | 2 |

MULTILAYER CERAMIC CAPACITOR

BACKGROUND

Field of the Invention

The present invention relates to a multilayer ceramic capacitor constituted by a capacitor body and external electrodes of roughly L shape provided on the opposing ends thereof.

Description of the Related Art

One known mode of external electrodes provided on the opposing ends of a multilayer ceramic capacitor is that the external electrodes each have a roughly L shape having a part along one length-direction face, and a part along one height-direction face, of the capacitor body (refer to Patent Literature 1 mentioned below). The multilayer ceramic capacitor disclosed in Patent Literature 1 mentioned below (hereinafter referred to as "conventional multilayer ceramic capacitor") comprises: a capacitor body having a first face and a second face that are facing each other in the length direction, a third face and a fourth face that are facing each other in the width direction, and a fifth face and a sixth face that are facing each other in the height direction; a first external electrode of roughly L shape having a first part along the first face, and a second part along the fifth face, of the capacitor body; and a second external electrode of roughly L shape having a first part along the second face, and a second part along the fifth face, of the capacitor body. The capacitor body has a built-in capacitive part constituted by multiple first internal electrode layers and multiple second internal electrode layers stacked alternately with dielectric layers in between. An end of each of the multiple first internal electrode layers is connected to the first part of the first external electrode. Also, an end of each of the multiple second internal electrode layers is connected to the first part of the second external electrode.

The conventional multilayer ceramic capacitor has a roughly L shape, where neither the first external electrode nor the second external electrode has any part along the sixth face, any part along the third face, or any part along the fourth face, of the capacitor body. This means that, compared to a multilayer ceramic capacitor of the same external dimensions (length, width and height) that uses U-shaped external electrodes, each having a part along the sixth face, the conventional multilayer ceramic capacitor allows the height-direction dimension of its capacitor body to be designed larger by the thickness of the part along the sixth face. Also, compared to a multilayer ceramic capacitor of the same external dimensions that uses external electrodes of square cylinder shape with bottom, each having a part along the sixth face, a part along the third face, and a part along the fourth face, the conventional multilayer ceramic capacitor allows the height-direction dimension and width-direction dimension of its capacitor body to be each designed larger by the thickness of the part along the sixth face, thickness of the part along the third face, and thickness of the part along the fourth face. In other words, the number of internal electrode layers and the area of the internal electrode layer can be increased based on a dimensional expansion of the capacitor body, which contributes to capacitance increase.

Concerning the aforementioned capacitance increase, attempts have been made to use a dielectric ceramic of high dielectric constant associated with high relative permittivity, as the material for the capacitor body except for the first internal electrode layer and second internal electrode layer; however, use of a dielectric ceramic of high dielectric constant causes the DC bias characteristics of the multilayer ceramic capacitor itself to worsen, and this causes the effective capacitance to drop significantly when a direct-current voltage higher than the rated voltage is applied.

BACKGROUND ART LITERATURES

[Patent Literature 1] Japanese Patent Laid-open No. 2015-228481

SUMMARY

An object of the present invention is to provide a multilayer ceramic capacitor that can keep its DC bias characteristics from worsening, without diminishing the benefit of capacitance increase, and even when a dielectric ceramic of high dielectric constant is used for the purpose of increasing the capacitance further.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor pertaining to the present invention represents a multilayer ceramic capacitor comprising: (1) a capacitor body having a first face and a second face that are facing each other in the length direction, a third face and a fourth face that are facing each other in the width direction, and a fifth face and a sixth face that are facing each other in the height direction, as well as a built-in capacitive part constituted by multiple first internal electrode layers and multiple second internal electrode layers stacked alternately with dielectric layers in between; (2) a first external electrode having a first part along the first face, and a second part along the fifth face, of the capacitor body, where ends of the multiple first internal electrode layers are connected to the first part, respectively; and (3) a second external electrode having a first part along the second face, and a second part along the fifth face, of the capacitor body, where ends of the multiple second internal electrode layers are connected to the first part, respectively; wherein the first face of the capacitor body has a concave shape and the first part of the first external electrode contacts the first face of the capacitor body, and the second face of the capacitor body has a concave shape and the first part of the second external electrode contacts the second face of the capacitor body.

According to the present invention, a multilayer ceramic capacitor can be provided that can keep its DC bias characteristics from worsening, without diminishing the benefit of capacitance increase, and even when a dielectric ceramic of high dielectric constant is used for the purpose of increasing the capacitance further.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

10—Multilayer ceramic capacitor, 11—Capacitor body, f1—Concave-shaped first face of the capacitor body, f2—Concave-shaped second face of the capacitor body, Dmax—Maximum length-direction dimension between the concave-shaped first face and concave-shaped second face of the capacitor body, Dmin—Minimum length-direction dimension between the concave-shaped first face and concave-shaped second face of the capacitor body, f3—Plane-shaped third face of the capacitor body, f4—Plane-shaped fourth face of the capacitor body, f5—Plane-shaped fifth face of the capacitor body, f6—Plane-shaped sixth face of the capacitor body, 12—First external electrode, 12a—First part of the first external electrode, 12b—Second part of the first external electrode, 13—Second external electrode, 13a—First part of the second external electrode, 13b—Second part of the second external electrode.

DETAILED DESCRIPTION OF EMBODIMENTS

Figure 1:
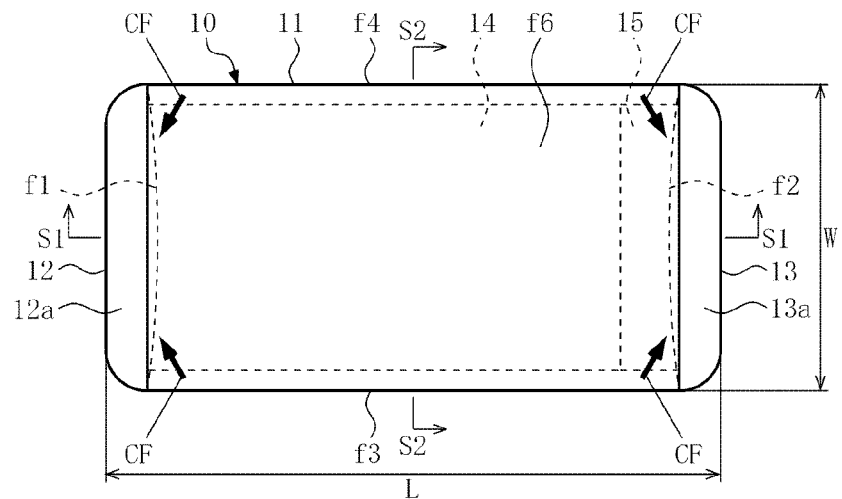
FIG. 1 is a view of a multilayer ceramic capacitor to which the present invention is applied, from the sixth face f6 side of the capacitor body.
Figure 2:
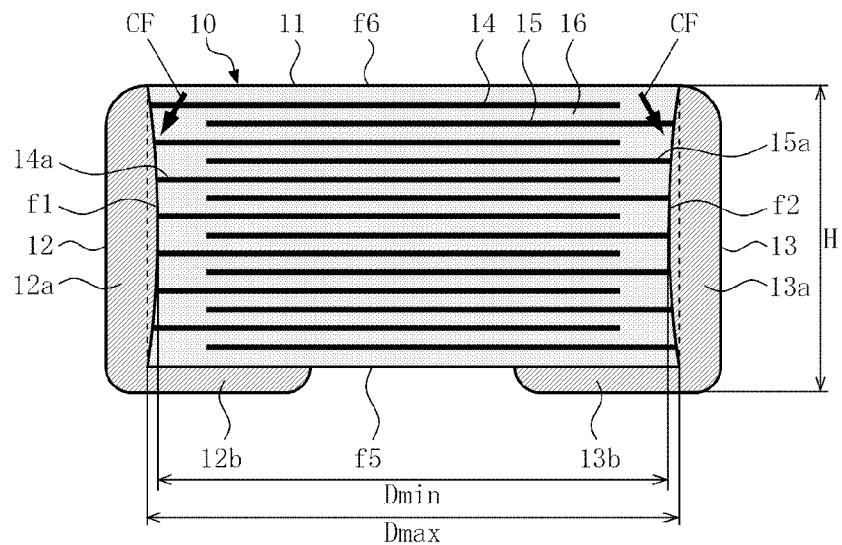
FIG. 2 is a section view of FIG. 1 along line S1-S1.
Figures 3, 4:
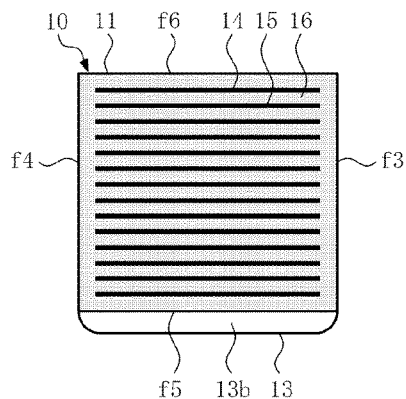
FIG. 3 is a section view of FIG. 1 along line S2-S2.
FIG. 4 shows the specifications and characteristics of evaluation samples.

First, the structure of a multilayer ceramic capacitor 10 to which the present invention is applied, is explained using FIGS. 1 to 3.

The size of the multilayer ceramic capacitor 10 is specified by its length L, width W, and height H. This multilayer ceramic capacitor 10 has a capacitor body 11 of roughly rectangular solid shape, a first external electrode 12 of roughly L shape, and a second external electrode 13 of roughly L shape.

The capacitor body 11 has a first face f1 and a second face f2 that are facing each other in the length direction, a third face f3 and a fourth face f4 that are facing each other in the width direction, and a fifth face f5 and a sixth face f6 that are facing each other in the height direction. Also, the capacitor body 11 has a built-in capacitive part (not accompanied by symbol) constituted by multiple first internal electrode layers 14 and multiple second internal electrode layers 15 stacked alternately with dielectric layers 16 in between, where both sides in the width direction, and both sides in the height direction, of this capacitive part are covered with margin parts (not accompanied by symbol) made of dielectrics. It should be noted that the contour of each first internal electrode layer 14 and that of each second internal electrode layer 15 are rectangular, the contour dimensions and thickness of each first internal electrode layer 14 are roughly the same as the contour dimensions and thickness of each second internal electrode layer 15, and the dielectric layers 16 each have roughly the same thickness.

One length-direction end (left end in FIG. 2) of each first internal electrode layer 14 constitutes a lead part 14a, where the end of each lead part 14a is led out to the first face f1 of the capacitor body 11, and each end is connected to the first part 12a, as described below, of the first external electrode 12. Also, one length-direction end (right end in FIG. 2) of each second internal electrode layer 15 constitutes a lead part 15a, where the end of each lead part 15a is led out to the second face f2 of the capacitor body 11, and each end is connected to the first part 13a of the second external electrode 13.

The third face f3, fourth face f4, fifth face f5, and sixth face f6 of the capacitor body 11 each have a roughly flat plane shape, while the first face f1 and second face f2 each have a concave shape with depth. The "concave shape" here means a shape whose depth increases toward the center or an area near the center, and the surface may be irregular or smooth. In FIG. 2, Dmax and Dmin are exemplifying dimensions to specify a "concave shape" configuration, where Dmax represents the maximum length-direction dimension between the first face f1 of the concave shape and the second face f2 of the concave shape, or specifically the maximum length-direction dimension that manifests between the edge of the first face f1 and the edge of the second face f2, while Dmin represents the minimum length-direction dimension between the first face f1 of the concave shape and the second face f2 of the concave shape, or specifically the minimum length-direction dimension that manifests between the deepest part of the concave shape of the first face f1 and the deepest part of the concave shape of the second face f2. It should be noted that, although preferably the maximum depth of the first face f1 of the concave shape is roughly the same as the maximum depth of the second face f2 of the concave shape, the two need not be roughly the same. In addition, although preferably the mode of the first face f1 of the concave shape is roughly the same as the mode of the second face f2 of the concave shape, the two need not be roughly the same.

The first external electrode 12 is of roughly L shape, having a first part 12a along the concave-shaped first face f1, and a second part 12b along the plane-shaped fifth face f5, of the capacitor body 11, where the first part 12a contacts the concave-shaped first face f1 and the second part 12b contacts the plane-shaped fifth face f5. Also, the second external electrode 13 is of roughly L shape, having a first part 13a along the concave-shaped second face f2, and a second part 13b along the plane-shaped fifth face f5, of the capacitor body 11, where the first part 13a contacts the concave-shaped second face f2 and the second part 13b contacts the plane-shaped fifth face f5.

In addition, the thickness of the first part 12a of the first external electrode 12 is greater than the maximum depth of the concave-shaped first face f1 of the capacitor body 11, while the thickness of the first part 13a of the second external electrode 13 is greater than the maximum depth of the concave-shaped second face f2 of the capacitor body 11. This means that, when the capacitor body 11 is viewed from the sixth face f6 side, the first part 12a of the first external electrode 12 and the first part 13a of the second external electrode 13 project outward from the capacitor body 11, respectively. It should be noted that, although preferably the thickness of the projected part of the first part 12a of the first external electrode 12 is roughly the same as the thickness of the projected part of the first part 13a of the second external electrode 13, the two need not be roughly the same. Also, the thickness and length-direction dimension of the second part 12b of the first external electrode 12 are roughly the same as the thickness and length-direction dimension of the second part 13b of the second external electrode 13.

Although not illustrated, the first external electrode 12 has a two-layer structure constituted by a base film contacting the concave-shaped first face f1 and plane-shaped fifth face f5 of the capacitor body 11, as well as a surface film contacting the exterior face of the base film, or a multi-layer structure having at least one intermediate layer between a base film and a surface film. Also, the second external electrode 13 has a two-layer structure constituted by a base film contacting the concave-shaped second face f2 and plane-shaped fifth face f5 of the capacitor body 11, as well as a surface film contacting the exterior face of the base film, or a multi-layer structure having at least one intermediate layer between a base film and a surface film.

Regarding the material of the capacitor body 11, preferably a dielectric ceramic of high dielectric constant whose primary component is barium titanate, strontium titanate, calcium titanate, magnesium titanate, calcium zirconate, calcium titanate zirconate, barium zirconate, titanium oxide, etc., or more preferably a dielectric ceramic of high dielectric constant whose relative permittivity is 1000 or more, can be used for the capacitor body 11 except for the first internal electrode layers 14 and second internal electrode layers 15.

Regarding the material of each first internal electrode layer 14 and that of each second internal electrode layer 15, preferably a good conductor whose primary component is nickel, copper, palladium, platinum, silver, gold, or alloy thereof, etc., can be used for each first internal electrode layer 14 and each second internal electrode layer 15.

Regarding the material and production method of the base film, etc., of the first external electrode 12 and second external electrode 13, the base film of the first external electrode 12 and that of the second external electrode 13 are each constituted by a baked film or plating film, for example, and for this base film, preferably a good conductor whose primary component is nickel, copper, palladium, platinum, silver, gold, or alloy thereof, etc., can be used. The surface film is constituted by a plating film, for example, and for this surface film, preferably a good conductor whose primary component is copper, tin, palladium, gold, zinc, or alloy thereof, etc., can be used. The intermediate film is constituted by a plating film, for example, and for this intermediate film, preferably a good conductor whose primary component is platinum, palladium, gold, copper, nickel, or alloy thereof, etc., can be used.

It should be noted that, while FIGS. 1 to 3 depict the multilayer ceramic capacitor 10 whose length L, width W, and height H satisfy a relationship of "Length L>Width W=Height H," the relationship of length L, width W, and height H may be "Length L>Width W>Height H," "Length L>Height H>Width W," "Width W>Length L=Height H," "Width W>Length L>Height H," or "Width W>Height H>Length L." Also, the drawings show seven first internal electrode layers 14 and seven second internal electrode layers 15, as well as 13 dielectric layers 16; however, these are merely for the purpose of illustration and the number of first internal electrode layers 14 and that of second internal electrode layers 15 can be eight or more (the number of dielectric layers 16 can be 15 or more) or six or less (the number of dielectric layers 16 can be 11 or less).

Next, a manufacturing example suitable for the multilayer ceramic capacitor 10 is explained by using the symbols in FIGS. 1 to 3 as deemed appropriate.

For the manufacture, a ceramic slurry containing dielectric ceramic powder, a first electrode paste containing good conductor powder, and a second electrode paste containing good conductor powder and co-material (the same dielectric ceramic powder contained in the ceramic slurry), are prepared. Next, the ceramic slurry is applied on the surface of carrier films, and then dried, to prepare first green sheets. Also, the first electrode paste is printed on the surface of first green sheets, and then dried, to prepare second green sheets on which internal electrode patterns are formed and which will become first internal electrode layers 14 and second internal electrode layers 15.

Next, a specified number of unit sheets cut out from the first green sheets are stacked and thermally bonded one by one, to prepare an area corresponding to one margin part in the height direction. Also, a specified number of unit sheets (including internal electrode patterns) cut out from the second green sheets are stacked and thermally bonded one by one, to prepare an area corresponding to the capacitive part. Furthermore, a specified number of unit sheets cut out from the first green sheets are stacked and thermally bonded one by one, to prepare an area corresponding to the other margin part in the height direction. Finally, the entire stack is thermally bonded for one last time to prepare an unsintered laminate sheet.

Next, the unsintered laminated sheet is cut to a grid to prepare unsintered chips. Next, both faces of the unsintered chips in the length direction are dipped in the second electrode paste and then the paste is dried, while the second electrode paste is also printed on one face of the unsintered chips in the height direction and then dried, to prepare unsintered base films corresponding to the base film of the first external electrode 12 and that of the second external electrode 13.

Next, the multiple unsintered chips on which unsintered base films have been formed are sintered (including binder removal and sintering) all at once in an ambience and according to a temperature profile appropriate for the dielectric ceramic powder contained in the ceramic slurry and the good conductor powder contained in the first electrode paste and second electrode paste, after which secondary sintering (re-oxidization) is performed as necessary, to prepare sintered chips. Next, the multiple sintered chips are barreled all at once to round the corners and ridgelines, to prepare capacitor bodies 11.

Both faces, in the length direction, of each unsintered chip obtained through the aforementioned unsintered chip preparation process each have a roughly flat plane shape; however, the unsintered base films formed on both faces of the unsintered chip in the length direction in the aforementioned unsintered base film preparation process contain the co-material, and no unsintered base film is formed on both faces in the width direction, and on the other face in the height direction, of the unsintered chip. This means that, in the unsintered chip preparation process, forces CF (refer to FIG. 1) apply to compress both faces of the unsintered chip in the length direction inward in the width direction, while forces CF (refer to FIG. 2) also apply to compress them inward in the height direction, according to the content of the co-material in the unsintered base film, and based on these compressive forces, both faces of the unsintered chip in the length direction are each formed into a concave shape.

It should be noted that, while the co-material (here, it is the same dielectric ceramic powder contained in the aforementioned ceramic slurry) contained in the unsintered base film exhibits the aforementioned action, concave formation similar to the foregoing can still be achieved using a material having a thermal expansion coefficient equivalent to that of this co-material, such as a different type of dielectric ceramic powder having a thermal expansion coefficient equivalent to that of the dielectric ceramic powder contained in the ceramic slurry, or glass powder having a thermal expansion coefficient equivalent to that of the dielectric ceramic powder contained in the ceramic slurry, or the like, instead of the aforementioned co-material.

Next, a surface film covering each base film on the sintered chip, or an intermediate film and a surface film, is/are formed by electroplating, electroless plating, or other wet plating method, or by sputtering, vacuum deposition, or other dry plating method, to prepare a first external electrode 12 and a second external electrode 13, respectively.

Next, the specifications, characteristics, etc., of Samples 1 to 12, prepared for the purpose of evaluating the multilayer ceramic capacitor 10, are explained using FIG. 4.

Samples 1 to 12 were each manufactured according to the aforementioned manufacturing example, where the common specifications and non-common specifications of each of Samples 1 to 12 are described below. It should be noted that all values shown in the common specifications and non-common specifications are design reference values and do not include manufacturing tolerance.

<Common Specifications of Samples 1 to 12 (Citing the Symbols in FIGS. 1 to 3)>
The rated voltage is 6.3 V and rated capacitance is 2.2 µF.
The length L is 600 µm, width W is 300 µm, and height H is 300 µm.
The capacitor body 11 has a length-direction dimension (corresponding to the maximum length-direction dimension Dmax) of 520 µm, width-direction dimension of 300 µm, and height-direction dimension of 275 µm.
The primary component of the capacitor body 11, except for the first internal electrode layer 14 and second internal electrode layer 15, is barium titanate.
The primary component of the first internal electrode layer 14 and second internal electrode layer 15 is nickel, each layer has a thickness of 0.5 µm, and there are 123 layers each.
The thickness of the dielectric layer 16 is 0.5 µm, and there are 245 layers.
The thickness of the width-direction margin part of the capacitor body 11 is 20 µm, and the thickness of the height-direction margin part is 15 µm.
The thickness of the projected part of the first part 12a of the first external electrode 12 and that of the projected part of the first part 13a of the second external electrode 13 are both 40 µm, and the thickness of the second part 12b of the first external electrode 12 and that of the second part 13b of the second external electrode 13 are both 25 µm.
The first external electrode 12 and second external electrode 13 each have a three-layer structure, constituted by a base film whose primary component is copper, an intermediate film whose primary component is nickel, and a surface film whose primary component is tin.

<Non-Common Specifications of Samples 1 to 12 (Citing the Symbols in FIGS. 1 to 3)>
The minimum length-direction dimension Dmin of Sample 1 is 520 µm.
The minimum length-direction dimension Dmin of Sample 2 is 515 µm.
The minimum length-direction dimension Dmin of Sample 3 is 510 µm.
The minimum length-direction dimension Dmin of Sample 4 is 504 µm.
The minimum length-direction dimension Dmin of Sample 5 is 499 µm.
The minimum length-direction dimension Dmin of Sample 6 is 494 µm.
The minimum length-direction dimension Dmin of Sample 7 is 489 µm.
The minimum length-direction dimension Dmin of Sample 8 is 484 µm.
The minimum length-direction dimension Dmin of Sample 9 is 478 µm.
The minimum length-direction dimension Dmin of Sample 10 is 473 µm.
The minimum length-direction dimension Dmin of Sample 11 is 468 µm.
The minimum length-direction dimension Dmin of Sample 12 is 463 µm.
The minimum length-direction dimension Dmin of each of Samples 1 to 12 was varied by using, in the aforementioned manufacturing example, a second electrode paste of different co-material content.

Under "Dmin/Dmax" in FIG. 4, a value calculated by dividing the minimum length-direction dimension Dmin by the maximum length-direction dimension Dmax is shown for each of Samples 1 to 12. Under "Rate of drop in capacitance (%)" in FIG. 4, a value calculated by measuring the effective capacitance under application of a direct-current voltage (7.0 V) higher than the rated voltage (6.3 V) using the precision LCR meter 4284A by Agilent Technologies and then dividing the rated capacitance less the average effective capacitance of 100 capacitors of each sample, by the rated capacitance, is shown for each of Samples 1 to 12. Also, under "Incidence of delamination (%)" in FIG. 4, the number of capacitors whose internal electrode layers in the capacitor body exhibited delamination, among the 100 capacitors of each of Samples 1 to 12 whose cut face was observed with an optical microscope, is shown for each of Samples 1 to 12.

It is clear from the values under "Rate of drop in capacitance (%)" in FIG. 4 that the rates of drop in capacitance of Samples 3 to 12 are lower than the rates of drop in capacitance of Sample 1 and 2. It is also clear from the values under "Incidence of delamination (%)" in FIG. 4 that, among Samples 3 to 12, the incidences of delamination of Samples 3 to 11 are lower than the incidence of delamination of Sample 12. In other words, the range of Dmin/Dmax is preferably 0.90 or more and 0.98 or less when the values under "Rate of drop in capacitance (%)" as well as those under "Incidence of delamination (%)" in FIG. 4 are considered.

Next, the effects achieved by the multilayer ceramic capacitor 10 are explained.

(1) The multilayer ceramic capacitor 10 is formed in such a way that the first face f1 of the capacitor body 11 has a concave shape and the first part 12a of the first external electrode 12 contacts the concave-shaped first face f1, and that the second face f2 of the capacitor body 11 has a concave shape and the first part 13a of the second external electrode 13 contacts the concave-shaped second face f2. This means that, by adopting this constitution, the DC bias characteristics of the multilayer ceramic capacitor 10 itself can be kept from worsening, even when a dielectric ceramic of high dielectric constant is used for the capacitor body 11, except for the first internal electrode layer 14 and second internal electrode layer 15, for the purpose of increasing the capacitance further.

The fact that the DC bias characteristics can be kept from worsening by adopting the aforementioned constitution is evident from the foregoing explanation using FIG. 4; however, presumably the reason for the above is as follows. For example, the forces CF (refer to FIG. 1) that compress both faces of the unsintered chip in the length direction inward in the width direction, as well as the forces CF (refer to FIG. 2) that compress them inward in the height direction, in the sintered chip preparation process in the aforementioned manufacturing example, remain after manufacture. In other words, the multilayer ceramic capacitor 10 shown in FIGS. 1 to 3, because its first external electrode 12 and second external electrode 13 each have a roughly L shape, remains under the forces CF (refer to FIG. 1) that compress the concave-shaped first face f1 and concave-shaped second face f2 of the capacitor body 11 inward in the width direction, as well as the forces CF (refer to FIG. 2) that compress them inward in the height direction, and this is presumably why the relative permittivity of the dielectric ceramic of high dielectric constant does not change easily even when a direct-current voltage higher than the rated voltage is applied.

(2) With the multilayer ceramic capacitor 10, the thickness of the first part 12a of the first external electrode 12 is greater than the maximum depth of the concave-shaped first face f1 of the capacitor body 11, while the thickness of the first part 13a of the second external electrode 13 is greater than the maximum depth of the concave-shaped second face f2 of the capacitor body 11. This means that, by adopting this constitution, the DC bias characteristics of the multilayer ceramic capacitor 10 itself can, in a more reliable manner, be kept from worsening, even when a dielectric ceramic of high dielectric constant is used for the capacitor body 11, except for the first internal electrode layer 14 and second internal electrode layer 15, for the purpose of increasing the capacitance further.

The fact that the DC bias characteristics can, in a more reliable manner, be kept from worsening, by adopting the aforementioned constitution is evident from the foregoing explanation using FIG. 4, and, presumably the reason (without limiting the invention) for the above is as follows. For example, for the multilayer ceramic capacitor 10 shown in FIGS. 1 to 3 to remain under the forces CF (refer to FIG. 1) that compress the concave-shaped first face f1 and concave-shaped second face f2 of the capacitor body 11 inward in the width direction, as well as the forces CF (refer to FIG. 2) that compress them inward in the height direction, the first part 12a of the first external electrode 12 and the first part 13a of the second external electrode 13 must each have an adequate thickness. This is presumably why the aforementioned condition can be maintained reliably by making the thickness of the first part 12a of the first external electrode 12 greater than the maximum depth of the concave-shaped first face f1 of the capacitor body 11, and by making the thickness of the first part 13a of the second external electrode 13 greater than the maximum depth of the concave-shaped second face f2 of the capacitor body 11.

(3) With the multilayer ceramic capacitor 10, the maximum length-direction dimension Dmax and minimum length-direction dimension Dmin satisfy a condition of "$0.90 \leq Dmin/Dmax \leq 0.98$," where Dmax represents the maximum length-direction dimension between the concave-shaped first face f1 and concave-shaped second face f2 of the capacitor body 11, while Dmin represents the minimum length-direction dimension between the concave-shaped first face f1 and concave-shaped second face f2 of the capacitor body 11. This condition was explained earlier using FIG. 4; as long as this condition is satisfied, capacitance drop does not occur easily even when a direct-current voltage higher than the rated voltage is applied, and consequently the DC bias characteristics of the multilayer ceramic capacitor 10 itself can in a more reliable manner be kept from worsening, while at the same time both the first internal electrode layer 14 and second internal electrode layer 15 in the capacitor body 11 can be kept from delaminating, to provide a high-quality multilayer ceramic capacitor 10.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-035706, filed Feb. 26, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A multilayer ceramic capacitor, comprising:
 (1) a capacitor body having a first face and a second face that are facing each other in a length direction, a third face and a fourth face that are facing each other in a width direction, and a fifth face and a sixth face that are facing each other in a height direction, as well as a built-in capacitive part constituted by multiple first internal electrode layers and multiple second internal electrode layers stacked alternately with dielectric layers in between in the height direction;
 (2) a first external electrode having a first part along the first face, and a second part along the fifth face, of the capacitor body, where ends of the multiple first internal electrode layers are exposed on the first face and connected to the first part, respectively; and
 (3) a second external electrode having a first part along the second face, and a second part along the fifth face, of the capacitor body, where ends of the multiple second internal electrode layers are exposed on the second face and connected to the first part, respectively;
 wherein the first face of the capacitor body has a concave shape along the height direction and the first part of the first external electrode contacts the first face of the capacitor body; and
 wherein while the second face of the capacitor body has a concave shape along the height direction and the first part of the second external electrode contacts the second face of the capacitor body.

2. A multilayer ceramic capacitor according to claim 1, wherein a thickness of the first part of the first external electrode is greater than a maximum depth of the concave-shaped first face of the capacitor body, and a thickness of the first part of the second external electrode is greater than a maximum depth of the concave-shaped second face of the capacitor body.

3. A multilayer ceramic capacitor according to claim 1, wherein the maximum length-direction dimension Dmax and minimum length-direction dimension Dmin satisfy a condition "0.90≤Dmin/Dmax≤0.98," where Dmax represents a maximum length-direction dimension between the concave-shaped first face and concave-shaped second face of the capacitor body, and Dmin represents a minimum length-direction dimension between the concave-shaped first face and concave-shaped second face of the capacitor body.

4. A multilayer ceramic capacitor according to claim 2, wherein the maximum length-direction dimension Dmax and minimum length-direction dimension Dmin satisfy a condition "0.90≤Dmin/Dmax≤0.98," where Dmax represents a maximum length-direction dimension between the concave-shaped first face and concave-shaped second face of the capacitor body, and Dmin represents a minimum length-direction dimension between the concave-shaped first face and concave-shaped second face of the capacitor body.

5. A multilayer ceramic capacitor according to claim 1, wherein the first face of the capacitor body is spherically concaved toward its center, and the second face of the capacitor body is spherically concaved toward its center.

6. A multilayer ceramic capacitor according to claim 1, wherein the first part of the first external electrode entirely contacts the first face of the capacitor body, and the first part of the second external electrode entirely contacts the second face of the capacitor body.

7. A multilayer ceramic capacitor, comprising:
(1) a capacitor body having a first face and a second face that are facing each other in a length direction, a third face and a fourth face that are facing each other in a width direction, and a fifth face and a sixth face that are facing each other in a height direction, as well as a built-in capacitive part constituted by multiple first internal electrode layers and multiple second internal electrode layers stacked alternately with dielectric layers in between;
(2) a first external electrode having a first part along the first face, and a second part along the fifth face, of the capacitor body, where ends of the multiple first internal electrode layers are connected to the first part, respectively; and
(3) a second external electrode having a first part along the second face, and a second part along the fifth face, of the capacitor body, where ends of the multiple second internal electrode layers are connected to the first part, respectively;
wherein the first face of the capacitor body has a concave shape and the first part of the first external electrode contacts the first face of the capacitor body;
wherein the second face of the capacitor body has a concave shape and the first part of the second external electrode contacts the second face of the capacitor body; and
wherein the maximum length-direction dimension Dmax and minimum length-direction dimension Dmin satisfy a condition "0.90≤Dmin/Dmax≤0.98," where Dmax represents a maximum length-direction dimension between the concave-shaped first face and concave-shaped second face of the capacitor body, and Dmin represents a minimum length-direction dimension between the concave-shaped first face and concave-shaped second face of the capacitor body.

8. A multilayer ceramic capacitor, comprising:
(1) a capacitor body having a first face and a second face that are facing each other in a length direction, a third face and a fourth face that are facing each other in a width direction, and a fifth face and a sixth face that are facing each other in a height direction, as well as a built-in capacitive part constituted by multiple first internal electrode layers and multiple second internal electrode layers stacked alternately with dielectric layers in between;
(2) a first external electrode having a first part along the first face, and a second part along the fifth face, of the capacitor body, where ends of the multiple first internal electrode layers are connected to the first part, respectively; and
(3) a second external electrode having a first part along the second face, and a second part along the fifth face, of the capacitor body, where ends of the multiple second internal electrode layers are connected to the first part, respectively;
wherein the first face of the capacitor body has a concave shape and the first part of the first external electrode contacts the first face of the capacitor body;
wherein the second face of the capacitor body has a concave shape and the first part of the second external electrode contacts the second face of the capacitor body;
wherein a thickness of the first part of the first external electrode is greater than a maximum depth of the concave-shaped first face of the capacitor body, and a thickness of the first part of the second external electrode is greater than a maximum depth of the concave-shaped second face of the capacitor body; and
wherein the maximum length-direction dimension Dmax and minimum length-direction dimension Dmin satisfy a condition "0.90≤Dmin/Dmax≤0.98," where Dmax represents a maximum length-direction dimension between the concave-shaped first face and concave-shaped second face of the capacitor body, and Dmin represents a minimum length-direction dimension between the concave-shaped first face and concave-shaped second face of the capacitor body.

* * * * *